(12) United States Patent
Murakami

(10) Patent No.: US 7,828,371 B2
(45) Date of Patent: Nov. 9, 2010

(54) MOUNTING STRUCTURE OF DRIVERS CAB TO BASE FRAME AND CONSTRUCTION MACHINE THEREWITH

(75) Inventor: Yoshiaki Murakami, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 38 days.

(21) Appl. No.: 12/269,230

(22) Filed: Nov. 12, 2008

(65) Prior Publication Data
US 2009/0140547 A1 Jun. 4, 2009

(30) Foreign Application Priority Data
Nov. 30, 2007 (JP) .............................. 2007-310343

(51) Int. Cl.
*B62D 33/077* (2006.01)
(52) U.S. Cl. .............................. 296/190.03; 296/190.07
(58) Field of Classification Search ............ 296/190.03, 296/190.04, 190.07
See application file for complete search history.

(56) References Cited

U.S. PATENT DOCUMENTS
7,364,223 B2 *  4/2008  Mori et al. ............. 296/190.07

FOREIGN PATENT DOCUMENTS

| EP | 1 454 821 A1 | 9/2004 |
|---|---|---|
| JP | 10-204924 | 8/1998 |
| JP | 2001-193103 | 7/2001 |
| JP | 2002-339406 | 11/2002 |
| JP | 2004-189089 | 7/2004 |
| JP | 2005-344394 | 12/2005 |
| JP | 2006-348509 | 12/2006 |

\* cited by examiner

*Primary Examiner*—Dennis H Pedder
(74) *Attorney, Agent, or Firm*—Oblon, Spivak, McClelland, Maier & Neustadt, L.L.P.

(57) ABSTRACT

A restraining means includes a shaft member projecting laterally from a frame member, and a plate which is fixed to a base frame and in which an insertion hole capable of inserting the shaft member therethrough is formed. The restraining means is configured so that an inner surface of the insertion hole and the shaft member are not in contact with each other within a moving range of a drivers cab allowable by an installation mount, and so that the inner surface of the insertion hole is in contact with an upper surface of the shaft member when the drivers cab is lifted from the base frame beyond the moving range.

9 Claims, 12 Drawing Sheets

FRONT ⟵⟶ REAR

FRONT ←→ REAR

LEFT ←——→ RIGHT

FRONT ←→ REAR

FIG. 7
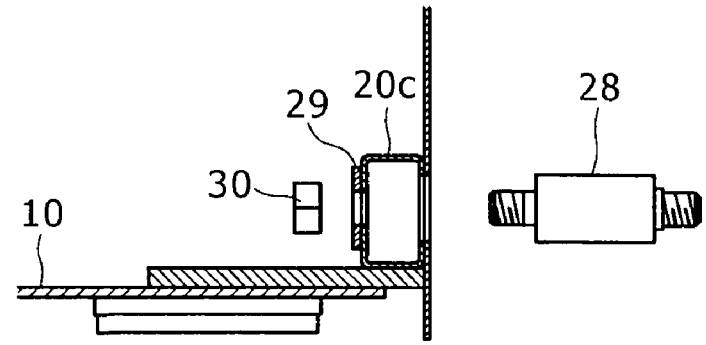
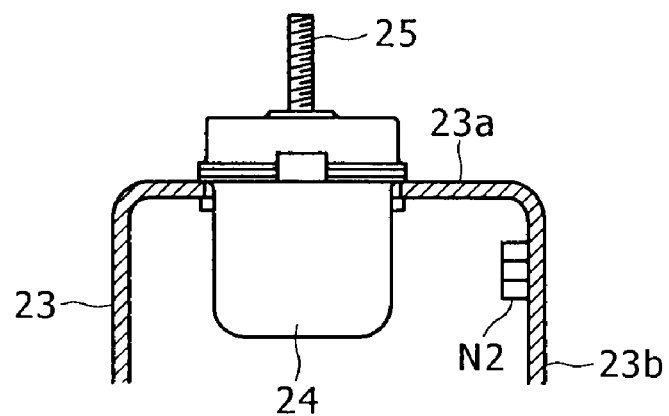
FIG. 8
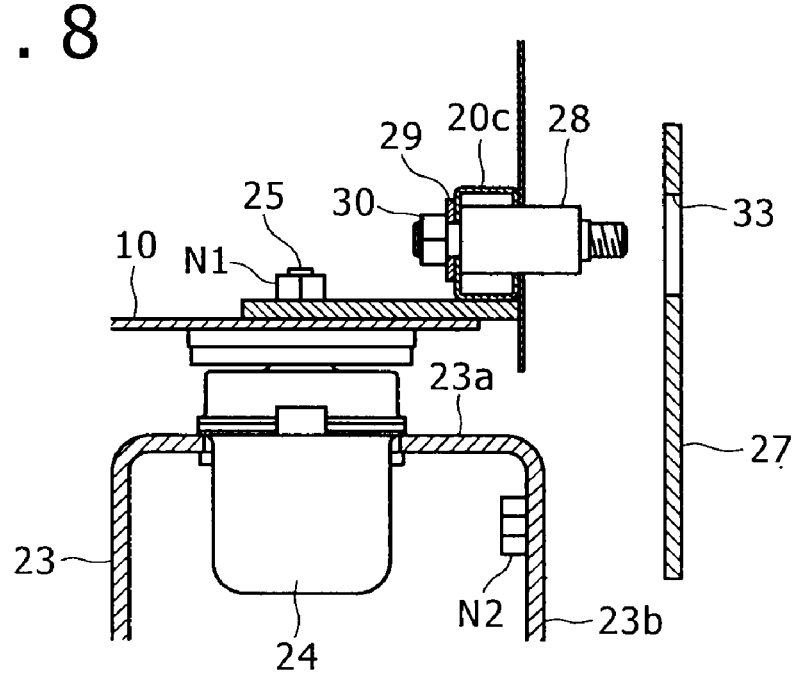

MOUNTING STRUCTURE OF DRIVERS CAB TO BASE FRAME AND CONSTRUCTION MACHINE THEREWITH

BACKGROUND OF THE INVENTION

1. Field of the Invention

The present invention relates to a mounting structure of drivers cab to base frame in construction machine such as hydraulic excavator.

2. Description of the Related Art

As for a construction machine equipped with a drivers cab on a base frame, for example, there is a hydraulic excavator wherein an operator's cab is connected to a rotating frame through a vibration-proof mount, as disclosed in Japanese Patent Laid-Open No. 2001-193103 (Patent Document 1). FIG. 14 is an enlarged side sectional view showing a part of the hydraulic excavator of Patent Document 1.

As shown in FIG. 14, a vibration-proof mount 101 is provided with a threaded rod 105 extending above from a mount main body 104 fixed to a beam 103 of a rotating frame 102. The threaded rod 105 expands and contracts with respect to the mount main body 104, thereby exhibiting a vibration-proof function.

The threaded rod 105 is tightened by a nut 108 from above in a state of being passed through a floor plate 107 of an operator's cab positioned on the mount main body 104. As a result of connecting the threaded rod 105 and the floor plate 107, the operator's cab is supported on the rotating frame 102. Therefore, the vibration-proof function by the expansion and contraction of the threaded rod 105 is exerted when the floor plate 107 and the mount main body 104 are relatively displaced up and down.

Further, in the hydraulic excavator in Patent Document 1, a bolt 109 for regulating a further lift of the operator's cab at the time of exceeding the normal stroke of the vibration-proof mount 101 is provided. A lower end part of the bolt 109 is fixed to the beam 103 in a state of being passed through the beam 103 vertically, and a nut 110 is mounted to an upper end part thereof in a state where the bolt 109 is passed through the floor plate 107 vertically. The nut 110 is arranged with a gap 111 between the floor plate 107 so as to function as a coming-off prevention of the bolt 109 with respect to the floor plate 107 when the floor plate 107 and the rotating frame 102 are spaced by a predetermined distance. That is, when the floor plate 107 is spaced more than the gap 111, the floor plate 107 and the nut 110 are in contact with each other and the movement of the floor plate 107 is regulated by means of the nut 110.

However, in Patent Document 1, the floor plate 107 and the nut 110 are made in contact with each other in order to regulate the lift of operator's cab, and therefore there is a need for setting the strength of the floor plate 107 higher than the normal. Specifically, the configuration in which a reinforcing plate 112 is provided at the floor plate 107 to reinforce the floor plate 107 is disclosed.

SUMMARY OF THE INVENTION

It is an object of the invention to provide a mounting structure of drivers cab to base frame capable of effectively suppressing the lifting more than needs of the drivers cab without a large-scale reinforcement of the drivers cab and a construction machine therewith.

The mounting structure of drivers cab to base frame in the construction machine according to the present invention includes a base frame, a drivers cab provided on the base frame, vibration absorbing means for supporting the drivers cab in a state capable of contacting or separating up and down with respect to the base frame and for absorbing a vibration generated between the base frame and the drivers cab, and restraining means for restraining the lifting of the drivers cab with respect to the base frame at a predetermined position. In the mounting structure of drivers cab to base frame, the drivers cab includes a floor plate, and frame members which are provided on the floor plate and arranged so as to surround an operator's seat. The restraining means includes a projecting portion projecting laterally from the frame member, and an inserted member which is fixed to the base frame and in which an insertion hole capable of inserting the projecting portion therethrough is formed. Further, the restraining means is configured so that an inner surface of the insertion hole and an outer surface of the projecting portion are not in contact with each other within a moving range of the drivers cab allowable by the vibration absorbing means, and so that the inner surface of the insertion hole is in contact with an upper surface of the projecting portion when the drivers cab is lifted from the base frame beyond the moving range.

According to the present invention, the projecting portion projecting from the drivers cab is inserted into the inserted member fixed to the base frame, and these projecting portion and inserted member are in contact with each other, thereby restraining an upward movement of the projecting portion and thus an upward movement of the drivers cab.

Further, in the present invention, the projecting portion is fixed to the frame members arranged so as to surround an operator's seat, and therefore it is possible to restrain the upward movement of the drivers cab without a large-scale reinforcement to the drivers cab.

That is, as for the frame members arranged so as to surround the operator's seat, in order to minimize as much as possible a deformation volume of the drivers cab from a viewpoint of suppressing the narrowing of a space within an operator's cab such as at the time of falling down of the construction machine, a sufficient strength compared to other parts (for example, the floor plate) is secured. Therefore, it is possible to surely suppress a movement of the entire drivers cab by utilizing the strength of the frame member.

It should be noted that, in order to prevent the movement of the drivers cab in the configuration of the present invention, although a certain level of strength is required for a strength of the projecting portion itself, a strength of the inserted member itself, and a strength of fixation of the inserted member and the base frame, a large scale reinforcement to a large member such as the floor plate is not needed for a reinforcement of these configuration.

Further, while adopting a compact configuration that the projecting portion projecting laterally from the frame member is inserted into the inserted member in the present invention, it is possible to obtain an effect of suppressing the movement of drivers cab as noted above.

Therefore, according to the present invention, it is possible to effectively suppress the lifting more than needs of the drivers cab without a large-scale reinforcement to the drivers cab.

In the afore-mentioned mounting structure, preferably, the projecting portion is projected rearwardly from the one provided at a position corresponding to a rear surface of the drivers cab among the frame members, and the inserted member is fixed to the base frame so as to insert a rear part of the projecting portion.

In such a case, it is possible to restrain the lifting of the drivers cab at the position corresponding to the rear surface of the drivers cab, and thus it is possible to reduce the deformation volume of the drivers cab in a case of being subjected to an impact from behind.

That is, in a case where an impact is applied to the drivers cab from behind, the drivers cab tends to deform in a direction of spring-up of the rear part using a front lower part as a fulcrum, but in the afore-mentioned configuration, it is possible to restrain the spring-up of the rear part, and thus it is possible to reduce the deformation volume of the drivers cab. Particularly, in recent years, from a viewpoint of securing a safety of an operator at the time of falling down of the construction machine, the deformation volume of the drivers cab at the time of applying an impact from the side or from behind with respect to the drivers cab is considered as important. Therefore, it is possible to expand the safety of the operator by adopting this configuration.

Specifically, the frame members may include a beam member extending transversely to constitute the rear surface of the drivers cab, and the projecting portion may be fixed to the beam member.

In the afore-mentioned mounting structure, preferably, the frame members are formed from tube members, and the projecting portion is formed from a member fixed to the frame member in a state of being passed through the frame member in a substantially horizontal direction.

In such a case, the weight of the frame member is reduced by forming the frame member from the tube members, and simultaneously the projecting portion is supported by opposed wall portions of the frame member by passing the projecting portion through the frame member, and thereby it is possible to increase a supporting strength of the projecting portion with respect to the frame member.

In the afore-mentioned mounting structure, preferably, the projecting portion includes a main body member whose one end is removable with respect to the frame member, and a large-sized member removable to the other end of the main body member and formed larger than the main body member, while the insertion hole of the inserted member is set to a size so as to insert the main body member and not to insert the large-sized member.

In such a case, after mounting the drivers cab on the base frame, it is possible to fix the restraining means to these base frame and drivers cab. Specifically, the main body member is attached to the drivers cab mounted on the base frame while being inserted into the insertion hole of the inserted member, the large-sized member is mounted to the main body member, and thereby it is possible to achieve the coming-off prevention of the projecting portion from the inserted member.

Therefore, according to the afore-mentioned configuration, it is possible to mount the restraining means more easily than a case where the projecting portion of the drivers cab side is inserted into the insertion hole of the inserted member fixed to the base frame while mounting the base frame and the drivers cab.

Moreover, in a case where the inserted member and the base frame are configured removably to each other, even after mounting the main body member to the drivers cab, it is possible to mount the inserted member to the base frame while inserting the main body portion therethrough.

Meanwhile, the projecting portion may include a main body portion extending laterally from the frame member, and a large-sized portion provided at a tip of the main body portion and formed larger than the main body portion, while the insertion hole of the inserted member may have a shape having a passing portion capable of passing the large-sized portion therethrough, and a notch portion cut from the passing portion and set in a size so as to insert the main body portion and not to insert the large-sized portion, and the inserted member may be configured removably with respect to the base frame.

In this configuration as well, after mounting the drivers cab on the base frame, it is possible to fix the restraining means to these base frame and drivers cab. Specifically, after mounting the drivers cab on the base frame, the large-sized portion of the main body portion extending from the drivers cab is inserted into the passing portion of the inserted member, and the inserted member is mounted to the base frame. At this time, since the notch portion cut from the passing portion is formed in the inserted member, after moving the main body portion of the projecting portion so as to slide within the notch portion, the inserted member is mounted to the base frame.

Moreover, the present invention is a construction machine provided with the afore-mentioned mounting structure and a working attachment mounted on the base frame so as to raise or lower.

In such a case, it is possible to provide the construction machine enjoying the effects that the afore-mentioned mounting structure has.

BRIEF DESCRIPTION OF THE DRAWINGS

FIG. 7 is a side sectional view showing how the drivers cab is mounted on a base frame, in a state before mounting a shaft main body.

FIG. 8 is a side sectional view showing how the drivers cab is mounted on the base frame, in a state after placing the drivers cab on the base frame.

DESCRIPTION OF THE PREFERRED EMBODIMENTS

Hereinafter, a description will be given to preferred embodiments of the present invention with reference to the drawings.

Figure 1:
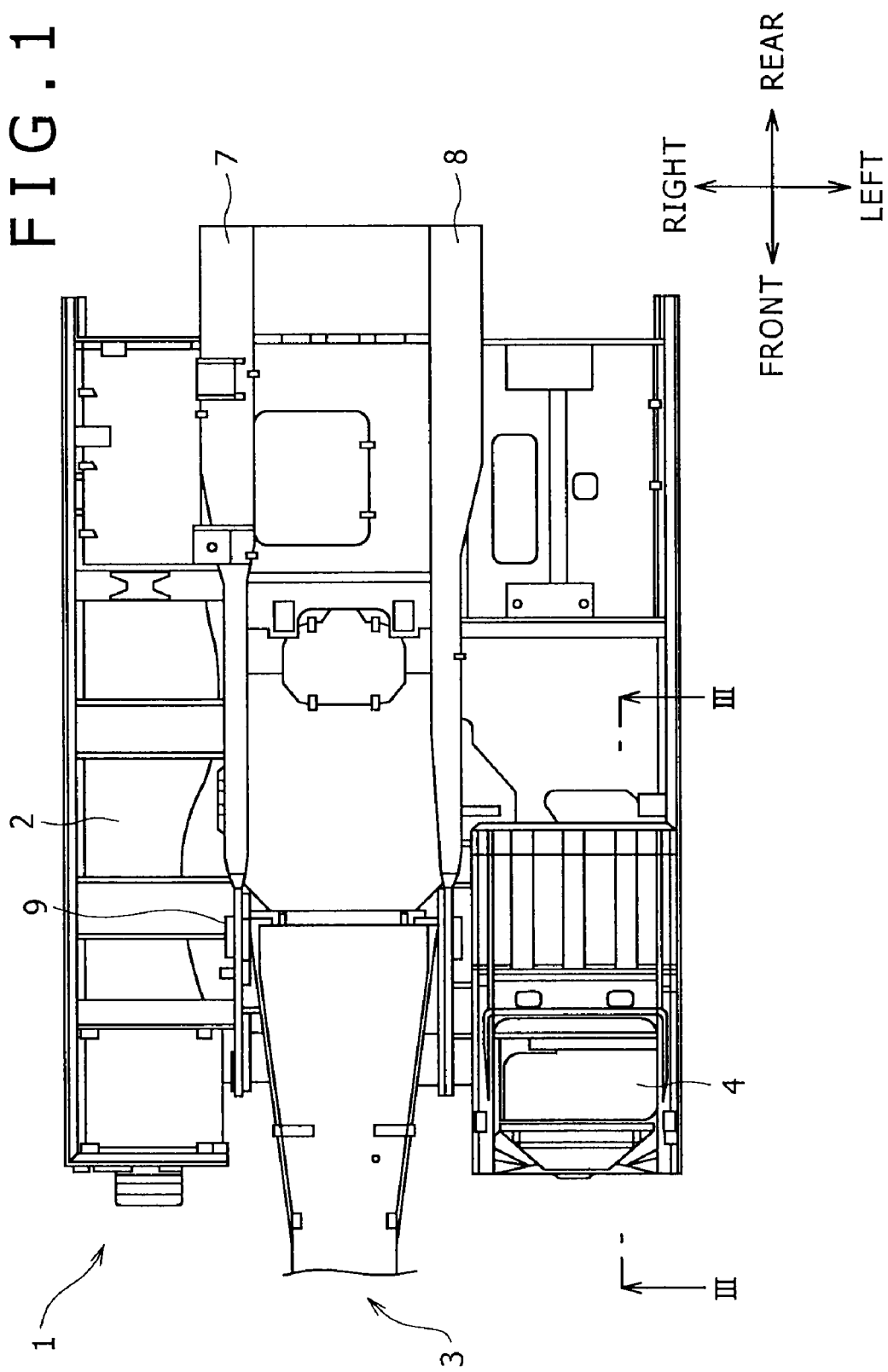
FIG. 1 is a plan view with a part omitted showing a hydraulic excavator according to an embodiment of the present invention.

FIG. 1 is a plan view with a part omitted showing a hydraulic excavator according to an embodiment of the present invention. With reference to FIG. 1, the hydraulic excavator as an example of a construction machine is provided with a lower traveling body (not shown) of self-traveling type and an upper rotating body 1 mounted rotatably on the lower traveling body.

The upper rotating body 1 is provided with a base frame 2 provided rotatably on the lower traveling body, a boom (working attachment) 3 supported so as to raise or lower on the base frame 2, a drivers cab 4 arranged in a standing condition on the base frame 2, installation mounts 5 (see FIG. 3) mounted between the drivers cab 4 and the base frame 2, and restraining means 6 (see FIG. 3) which restrain an upper movement of the drivers cab 4. It should be noted that a description will be given below using the front-and-rear (longitudinal) and right-and-left (transverse) directions in an operator's point of view in the drivers cab 4.

The base frame 2 is a plate-like frame formed in a substantially rectangular shape in plan view extending longitudinally. To the base frame 2, a pair of vertical plates 7, 8 extending longitudinally are arranged in a standing condition at a substantially middle position in the transverse direction of the base frame 2. A boom foot pin 9 is spread between these vertical plates 7, 8, and the boom 3 is supported by the boom foot pin 9.

Figure 2:
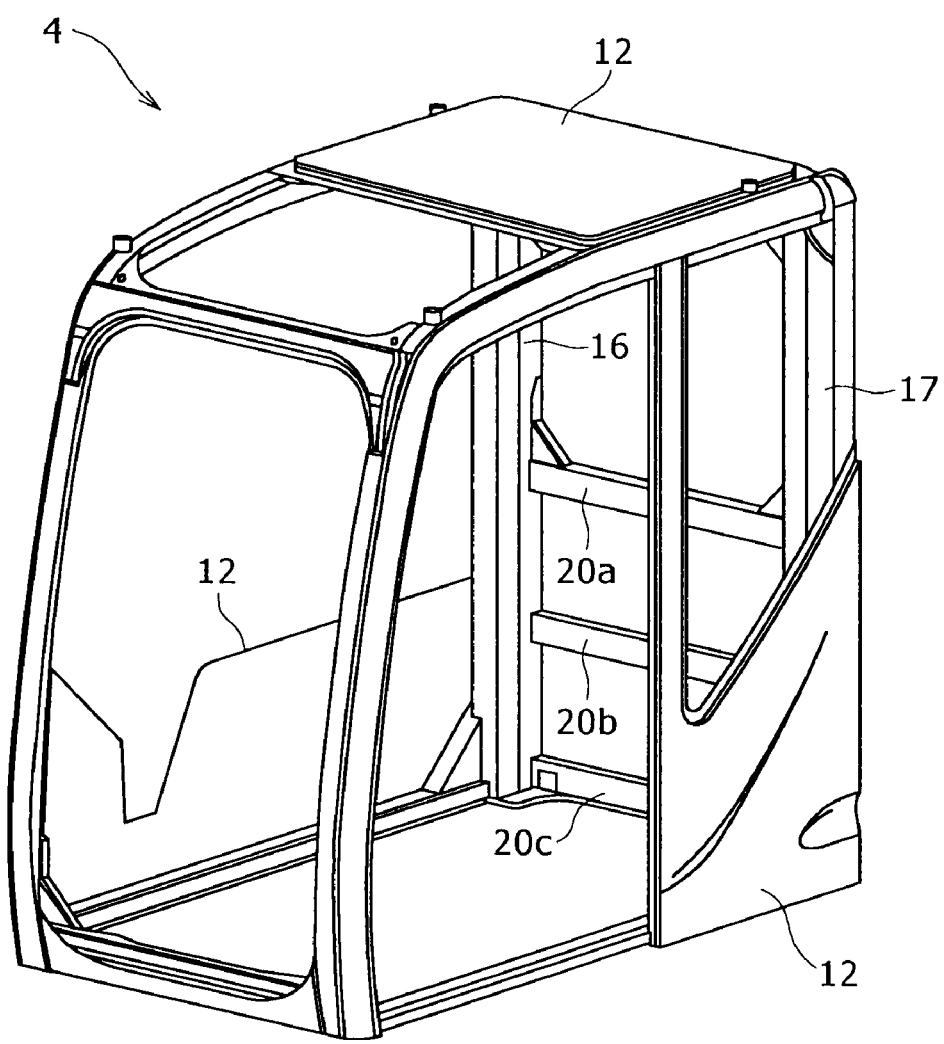
FIG. 2 is an exploded perspective view of a drivers cab in FIG. 1.
Figure 3:
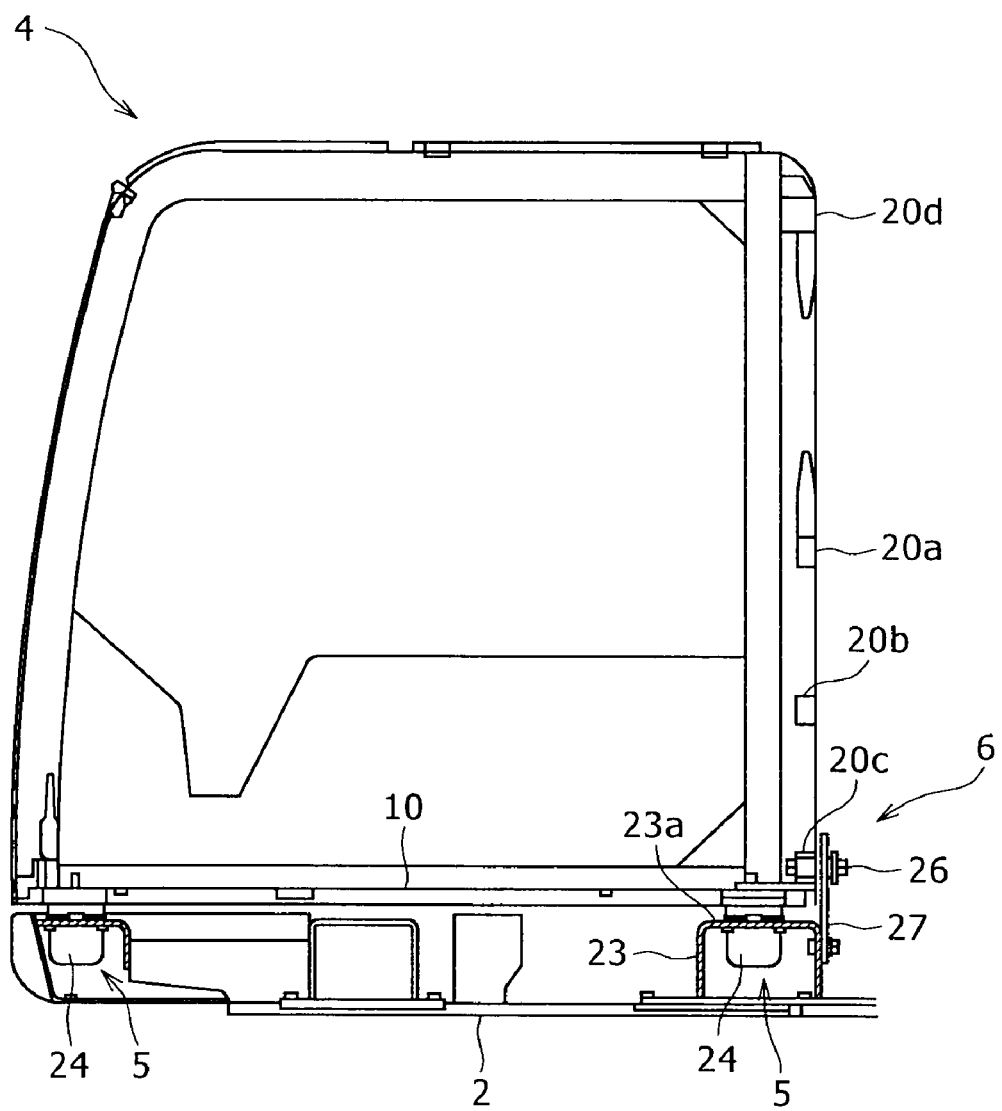
FIG. 3 is a sectional view by line III-III in FIG. 1.

FIG. 2 is an exploded perspective view of the drivers cab in FIG. 1, and FIG. 3 is a sectional view by line III-III in FIG. 1.

With reference to FIG. 2 and FIG. 3, the drivers cab 4 is provided at a left position of the left vertical plate 8 and in a front part of the base frame 2. The drivers cab 4 is provided with a floor plate 10 (see FIG. 3) constituting a floor surface of an operator's cab, frame members (described later) provided on the floor plate 10 and arranged in a standing condition in a rear part of the operator's cab, and an exterior panel material 12 mounted to the frame members.

The frame members are provided with a right rear support 16 and a left rear support 17 which are arranged in a standing condition on the floor plate 10. These supports 16 and 17 are disposed in mutually opposed transversely. It should be noted that, in the present embodiment, although the supports 16 and 17 arranged in a standing condition on the rear part of the operator's cab are described as an example of the frame members, a plurality of supports may be arranged in a standing condition so as to surround the operator's cab in front of these supports 16 and 17.

In addition, the frame members are provided with four upper and lower beam members 20a to 20d (20d is shown only in FIG. 3) extending transversely between the supports 16 and 17.

Figure 5:
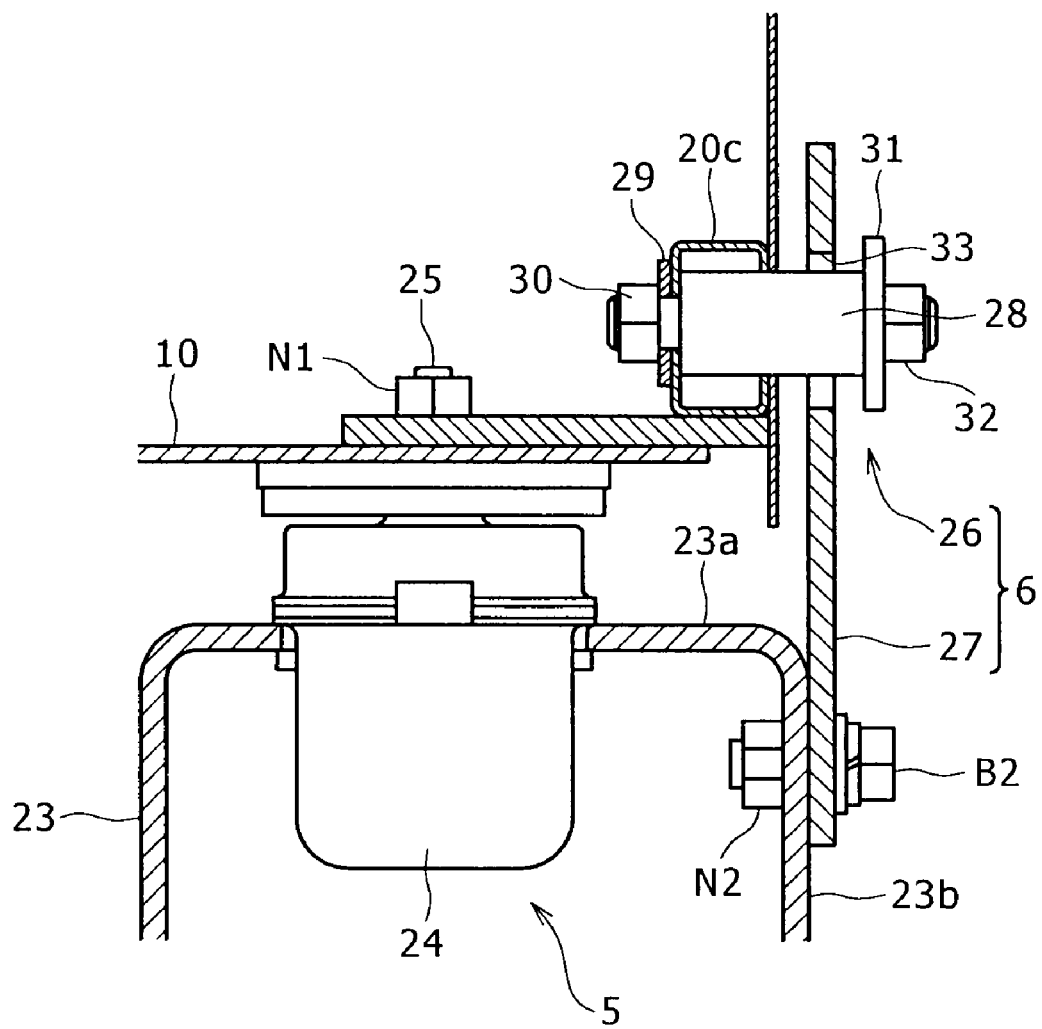
FIG. 5 is a sectional view by line V-V in FIG. 4.

Further, the frame member is constituted by tubular members each having a cross section of quadrangular shape as the beam member 20c is representatively shown in FIG. 5. Thereby, a sufficient strength is secured while reducing the weight of the frame member itself.

The exterior panel material 12 is mounted to the frame members from the outside to form the operator's cab therein.

Figure 4:
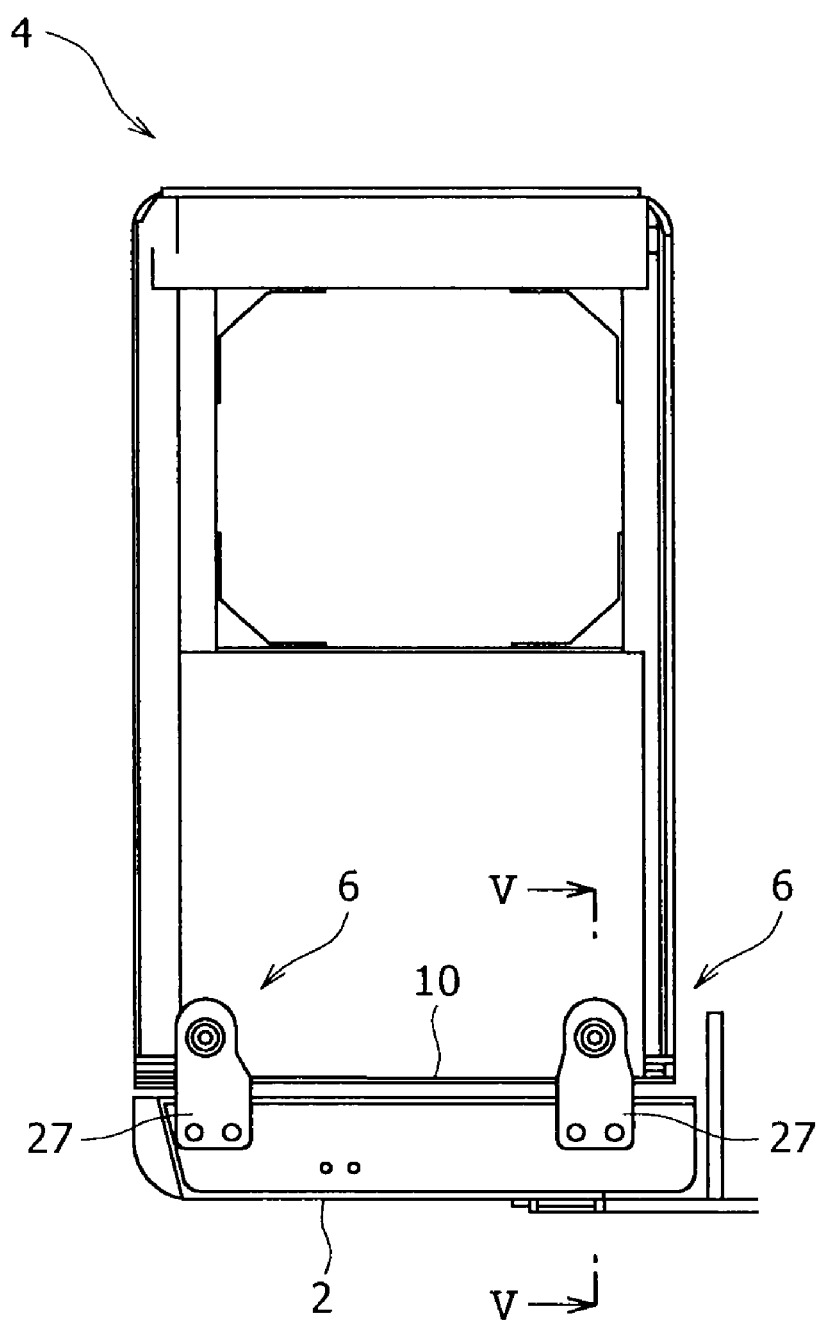
FIG. 4 is a rear view of the drivers cab of an upper rotating body in FIG. 1.
Figure 6:
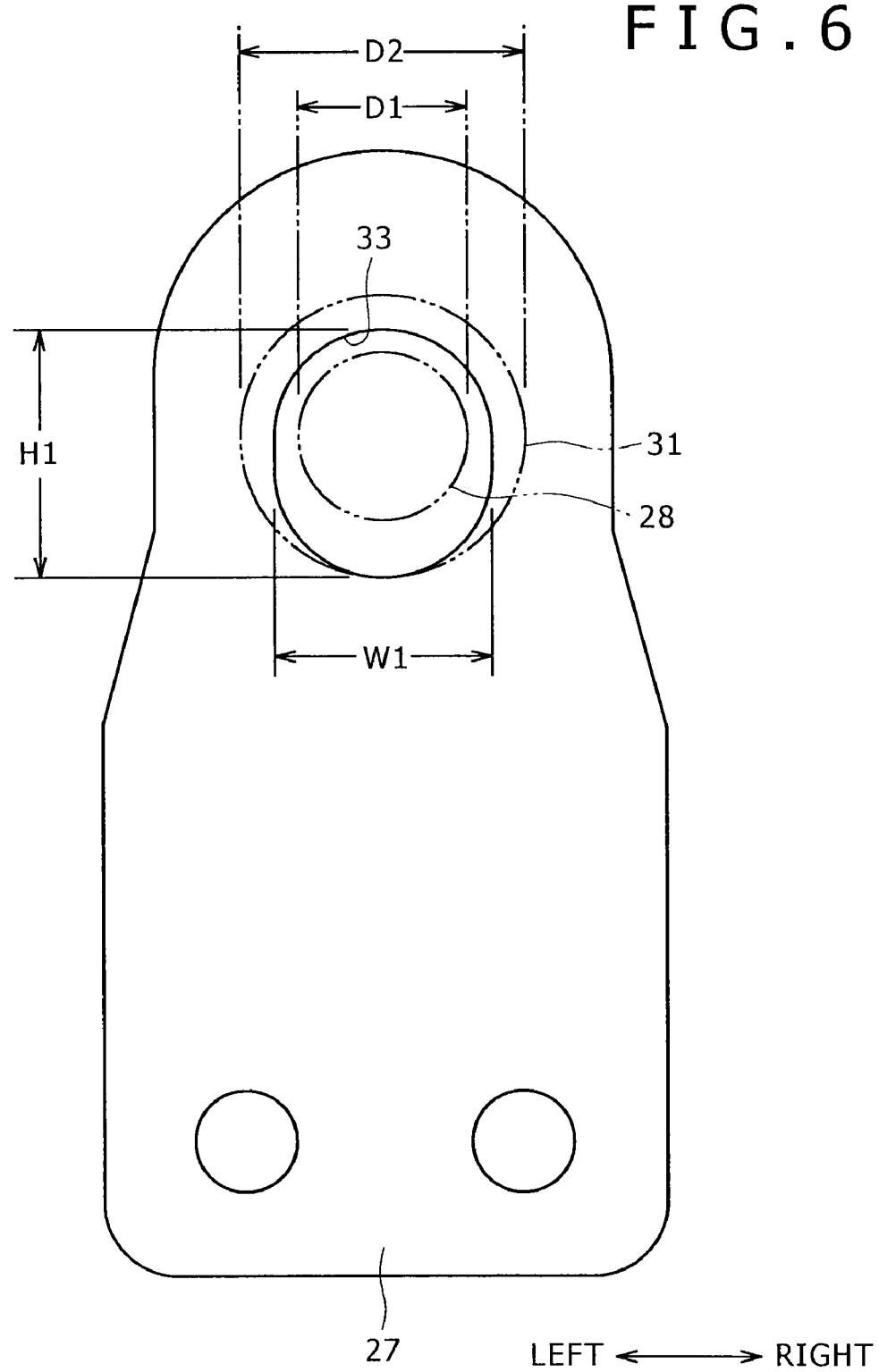
FIG. 6 is an enlarged plan view of a plate in FIG. 4.

FIG. 4 is a rear view of the drivers cab 4 of the upper rotating body 1 in FIG. 1. FIG. 5 is a sectional view by line V-V in FIG. 4. FIG. 6 is an enlarged plan view of the plate in FIG. 4.

With reference to FIG. 3 to FIG. 6, between the base frame 2 and the drivers cab 4, four installation mounts 5 are provided (two of them are shown in FIG. 3). Specifically, the respective installation mounts 5 are provided at a position corresponding to four corners of the drivers cab 4 respectively.

The installation mount 5 is provided with a mount main body 24 fixed to a raised portion 23 provided in a protruding manner on the base frame 2, and a fitting pin 25 extending upwardly from the mount main body 24. The fitting pin 25 moves up and down with respect to the mount main body 24 while being subjected to an action by a vibration-proof mechanism (not shown) provided within the mount main body 24.

The mount main body 24 is fixed to an upper surface 23a of the raised portion 23 in a state of being passed through the upper surface 23a. On the other hand, the fitting pin 25 is fixed to the floor plate 10 by tightening an upper end part thereof with a nut N1 from above in a state of being passed through a hole (not shown) formed in the floor plate 10. Thus, the floor plate 10 and the fitting pin 25 may move up and down as one unit. However, the fitting pin 25 is subjected to the action by the vibration-proof mechanism (not shown) of the mount main body 24, whereby a vibration between the floor plate 10 and the base frame 2 is absorbed.

Now, a description will be given to a configuration of the restraining means 6 according to the present embodiment with reference to FIG. 3 to FIG. 6.

A pair of right and left restraining means 6 are provided in the rear part of the drivers cab 4. The respective restraining means 6 have a substantially equivalent configuration, so only the configuration of the right restraining means will be described in the following description.

Specifically, the restraining means 6 is provided with a shaft member 26 fixed to the drivers cab 4, and a plate (an inserted member) 27 fixed to the base frame 2.

The shaft member 26 is fixed to the beam member 20c arranged at the bottom among the beam members 20a to 20d provided at a portion corresponding to the rear surface of the drivers cab 4. Specifically, the shaft member 26 is provided with a shaft main body 28 (see FIG. 7) that external thread portions are formed at both front and rear ends thereof, a washer 29 and a nut 30 mounted to the front end part of the shaft main body 28, and a ring 31 and a nut 32 mounted to the rear end part of the shaft main body 28.

The shaft main body 28 is fixed to the beam member 20c by being inserted into the hole formed in the beam member 20c and threadedly engaging the nut 30 in the external thread portion of the front end of the shaft main body 28 with the washer 29 therebetween. That is, the shaft main body 28 is fixed to the beam member 20c in a state of being passed longitudinally through the beam member 20c.

On the other hand, to the external thread portion at the rear end of the shaft main body 28, the nut 32 is mounted through the ring 31 having a diameter dimension D2 larger than a diameter dimension D1 of the shaft main body 28.

A lower end part of the plate 27 is fixed to a rear surface 23b (a nut N2 fixed to the rear surface 23b) of the raised portion 23 of the base frame 2 by means of a pair of right and left bolts B2. At the upper portion of the plate 27, an insertion hole 33 passing through longitudinally is formed, and into the insertion hole 33, a middle portion of the shaft main body 28 is inserted.

Specifically, a vertical dimension H1 of the insertion hole 33 is obtained by adding a vertical movement dimension and a dimension tolerance or the like of the drivers cab 4 (shaft main body 28) which are allowable by the installation mount 5 to the diameter dimension D1 of the shaft main body 28. Further, a width dimension W1 of the insertion hole 33 is obtained by adding a transverse movement dimension and a dimension tolerance or the like of the drivers cab 4 (shaft main body 28) which are allowable by the installation mount 5 to the diameter dimension D1 of the shaft main body 28. In other words, as long as the drivers cab 4 (shaft main body 28) moves within a range allowable by the installation mount 5, the respective dimensions H1 and W1 are set so as not to be in contact with the shaft main body 28. Specifically, the vertical dimension H1 in the present embodiment is set so that the shaft main body 28 and the inner surface of the insertion hole 33 are in contact with each other in case of exceeding an expansion limit value (that is, a maximum lifted position of the drivers cab 4 by which the vibration-proof function is secured: an example of a separated position) of the fitting pin 25 defined for the installation mount 5.

Further, the diameter dimension D2 of the ring 31 is set larger than the respective dimensions H1 and W1, and thereby the ring 31 may function as a coming-off prevention of the shaft member 26 with respect to the plate 27.

Now, a description will be given to an effect of the restraining means 6.

While the drivers cab 4 is moving up and down within the range allowable by the installation mount 5, the shaft main body 28 moves inside the insertion hole 33 of the plate 27. On the other hand, if the drivers cab 4 is lifted beyond the range allowable by the installation mount 5, the outer surface of the shaft main body 28 and the inner surface of the insertion hole 33 are in contact with each other, thereby the lifting of the shaft main body 28 and thus the lifting of the drivers cab 4 may be restrained by the plate 27.

It should be noted that, in the present embodiment, since the shaft member 26 is fixed to the beam member 20c which is disposed at the bottom among the beam members 20a to 20d, it is possible to shorten the plate 27 than a case of being fixed to the beam member 20a or 20b. Consequently, in the aforementioned embodiment, by shortening the plate 27 receiving a longitudinal tensile force at the time of restraining the drivers cab 4, it is possible to shorten an expansion amount of the plate 27 depending on the tensile force than a case where the plate 27 is longer and to lessen a deformation volume of the drivers cab 4.

Now, a description will be given to how the drivers cab 4 is mounted to the base frame 2 with reference to FIG. 7 to FIG. 10.

Firstly, as shown in FIG. 7, the shaft main body 28 is mounted to the drivers cab 4 prior to the installation on the base frame 2. Specifically, after inserting the shaft main body 28 into the hole of the beam member 20c, the washer 29 and the nut 30 are mounted to the external thread portion at the front end of the shaft main body 28.

Secondly, as shown in FIG. 8, the drivers cab 4 is mounted to the base frame 2. Specifically, the drivers cab 4 is positioned and placed with respect to the base frame 2 so that the fitting pin 25 of the installation mount 5 can be inserted into a hole (not shown) formed in the floor plate 10. Further, the nut N1 is threadedly engaged to the upper end part of the fitting pin 25.

Figure 9:
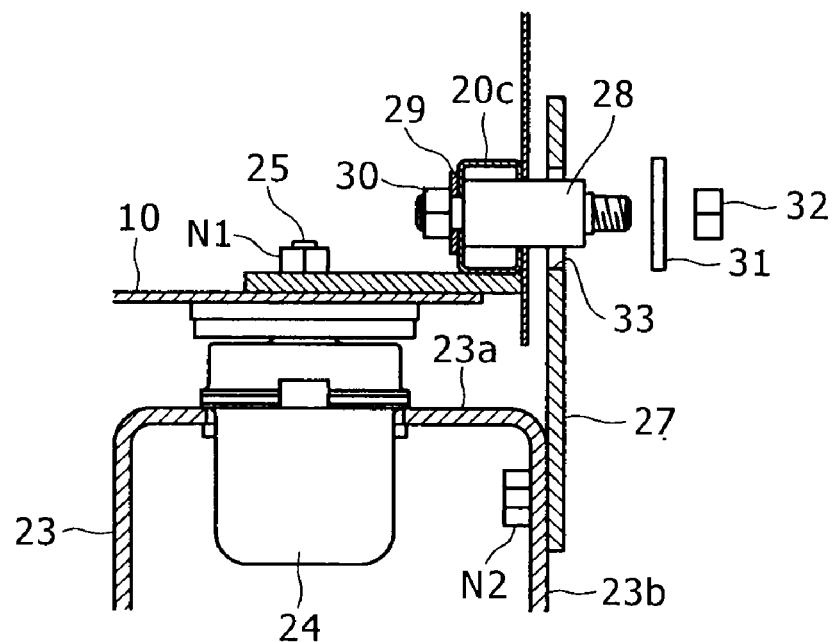
FIG. 9 is a side sectional view showing how the drivers cab is mounted on the base frame, in a state after inserting the shaft main body into an insertion hole of the plate.

Then, as shown in FIG. 9, the shaft main body 28 is inserted into the insertion hole 33 of the plate 27, and simultaneously the ring 31 and the nut 32 are mounted to the external thread portion at the rear end of the shaft main body 28. Thereby, the plate 27 is prevented from rearward coming-off.

Figure 10:
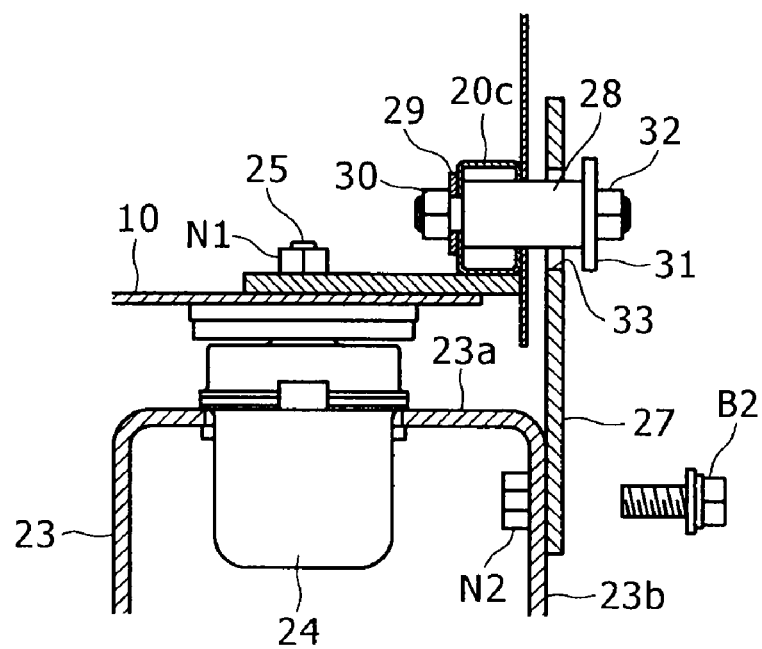
FIG. 10 is a side sectional view showing how the drivers cab is mounted on the base frame, in a state before mounting the plate to the drivers cab.

Further, as shown in FIG. 10, the lower end part of the plate 27 is fixed to the rear surface 23b (nut N2) of the raised portion 23 by means of the bolt B2.

As described above, according to the afore-mentioned embodiment, the shaft member 26 provided at the drivers cab 4 side is inserted into the insertion hole 33 of the plate 27 fixed to the base frame 2 side, and the shaft member 26 and the plate 27 are in contact with each other, thereby restraining the upward movement of the shaft member 26 and thus the upward movement of the drivers cab 4.

Further, in the afore-mentioned embodiment, it is assumed that the shaft member 26 is fixed to the frame members arranged so as to surround the operator's seat. Therefore, it is possible to restrain the upward movement of the drivers cab 4 without a large-scale reinforcement to the drivers cab 4.

That is, as for the frame member disposed at the rear part of the operator's cab, in order to minimize the deformation volume of the drivers cab 4 from a viewpoint of suppressing the narrowing of a space within the operator's cab such as at the time of falling down of the hydraulic excavator, a sufficient strength compared to other parts (for example, the floor plate 10) is secured. Therefore, it is possible to surely suppress the upward movement of the drivers cab 4 by utilizing the strength of the frame member.

Further, in the afore-mentioned embodiment, while adopting a compact configuration that the shaft member 26 projecting rearwardly from the frame member is inserted into the plate 27, it is possible to obtain the effect of suppressing the movement of the drivers cab 4 as noted above.

Therefore, according to the afore-mentioned embodiment, it is possible to effectively suppress the lifting more than needs of the drivers cab 4 without a large-scale reinforcement to the drivers cab 4.

As the afore-mentioned embodiment, if the shaft member 26 is fixed to the beam member 20c provided at a position corresponding to the rear surface of the drivers cab 4 among the frame members, it is possible to restrain the upward movement of the drivers cab 4 at the position corresponding to the rear surface of the drivers cab 4. Therefore, it is possible to reduce the deformation volume of the drivers cab 4 in case of being subjected to an impact from behind.

That is, in a case where an impact is applied to the drivers cab 4 from behind, the drivers cab 4 may deform in a direction of spring-up of the rear part using a front lower part as a fulcrum, but in the afore-mentioned embodiment, it is possible to restrain the spring-up of the rear part, and thus it is possible to reduce the deformation volume of the drivers cab 4. Particularly, in recent years, from a viewpoint of securing a safety of an operator at the time of falling down of the construction machine, the deformation volume of the drivers cab 4 at the time of applying an impact from the side or from behind with respect to the drivers cab 4 is considered as important. Therefore, it is possible to expand the safety of the operator by adopting the afore-mentioned embodiment.

As the aforementioned embodiment, if the shaft member 26 is fixed to the frame member in a state of being passed through the tubular frame member (beam member 20c), while reducing the weight of the frame member, the shaft member 26 is supported by opposed wall portions of the frame member by passing the shaft member 26 through the frame member (beam member 20c), thereby it is possible to increase a supporting strength of the shaft member 26 with respect to the frame member.

As the aforementioned embodiment, if the shaft member 26 includes the shaft main body 28 and the ring 31, and the insertion hole 33 of the plate 27 is set to a size so as to insert the shaft main body 28 and not to insert the ring 31, after mounting the drivers cab 4 on the base frame 2, it is possible to fix the restraining means 6 to the base frame 2 and the drivers cab 4. Specifically, the shaft main body 28 is mounted to the drivers cab 4 mounted on the base frame 2 while being inserted into the insertion hole 33 of the plate 27, the ring 31 is mounted to the shaft main body 28, and thereby it is possible to achieve the coming-off prevention of the shaft member 26 from the plate 27.

Therefore, according to the afore-mentioned configuration, it is possible to mount the restraining means 6 more easily than a case where the shaft main body 28 fixed to the drivers cab 4 is inserted into the insertion hole 33 of the plate 27 fixed to the base frame 2 while mounting the base frame 2 and the drivers cab 4.

Moreover, as the afore-mentioned embodiment, in a case where the plate 27 and the base frame 2 are configured removably to each other, even after mounting the shaft main body 28 to the drivers cab 4, it is possible to mount the plate 27 to the base frame 2 while inserting the shaft main body 28 therethrough.

Figure 11:
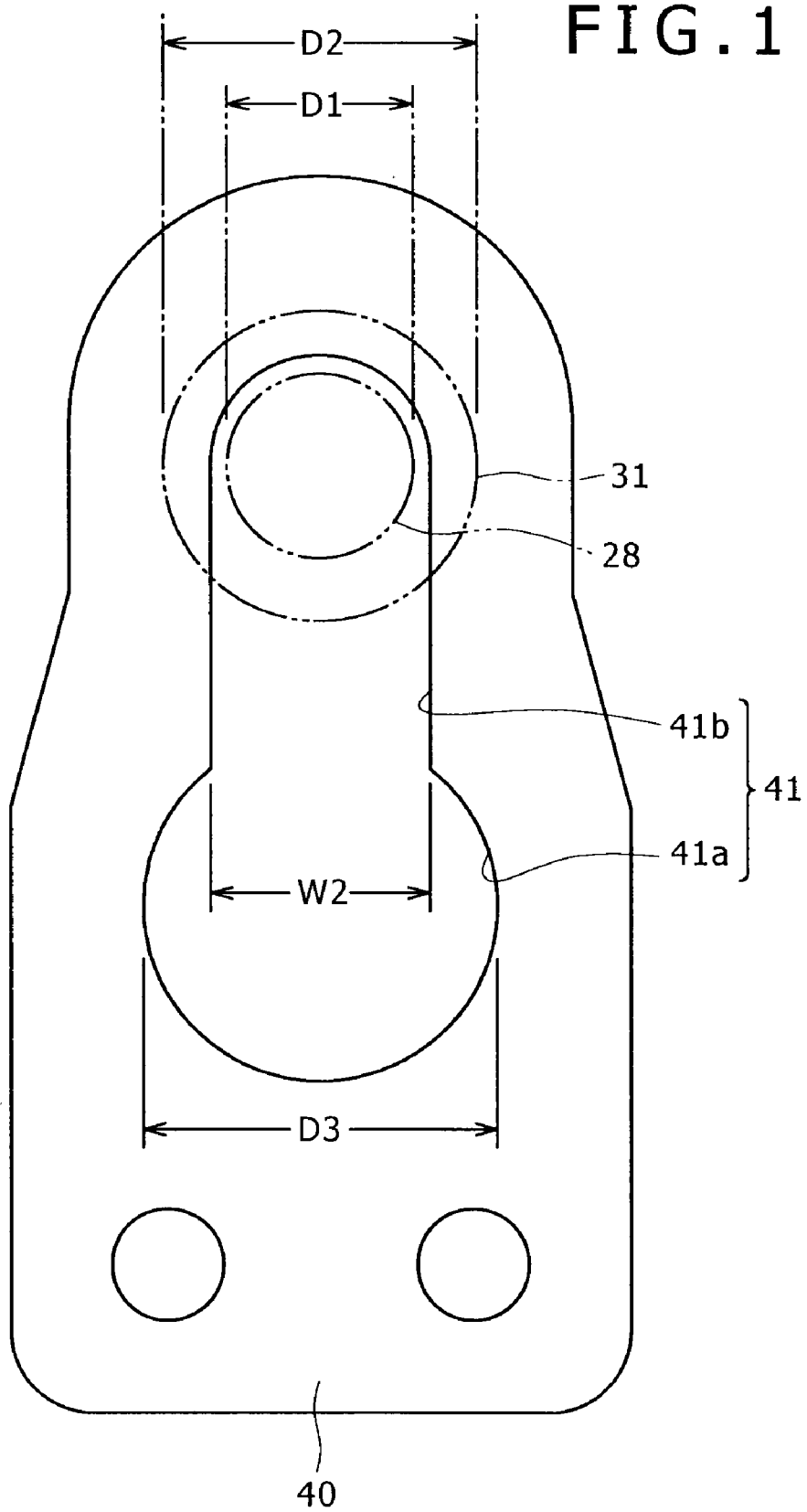
FIG. 11 is a plan view of a plate according to another embodiment of the present invention.

It should be noted that, in the afore-mentioned embodiment, although a coming-off prevention of the shaft member 26 from the plate 27 is performed by mounting the ring 31 and the nut 32 to the shaft member 26, it is possible to simplify the configuration of the shaft member by adopting the plate as in FIG. 11.

FIG. 11 is a plan view of a plate according to another embodiment of the present invention.

With reference to FIG. 11, an insertion hole 41 of a plate 40 in the present embodiment has a shape having a circular passing portion 41a having a diameter dimension D3 slightly larger than the diameter dimension D2 of the ring 31 in the afore-mentioned embodiment, and a notch portion 41b cut from the passing portion 41a and having a width dimension W2 larger than the diameter dimension D1 of the shaft main body 28 and smaller than the diameter dimension D2. It should be noted that an upper end position of the notch portion 41b is an equivalent position as the upper end position of the insertion hole 33 of the plate 27 in the afore-mentioned embodiment.

That is, with the shape as the insertion hole 41, even if a shaft member 42 (see FIG. 12) having a shape that the shaft main body 28, ring 31 and nut 32 of the afore-mentioned embodiment are configured as one unit is used, it is possible to easily perform an installation work of the base frame 2 and the drivers cab 4. Specifically, the shaft member 42 includes a main body portion 42a having the diameter dimension D1 and a flange portion (large-sized portion) 42b having the diameter dimension D2 as one unit.

Figure 12:
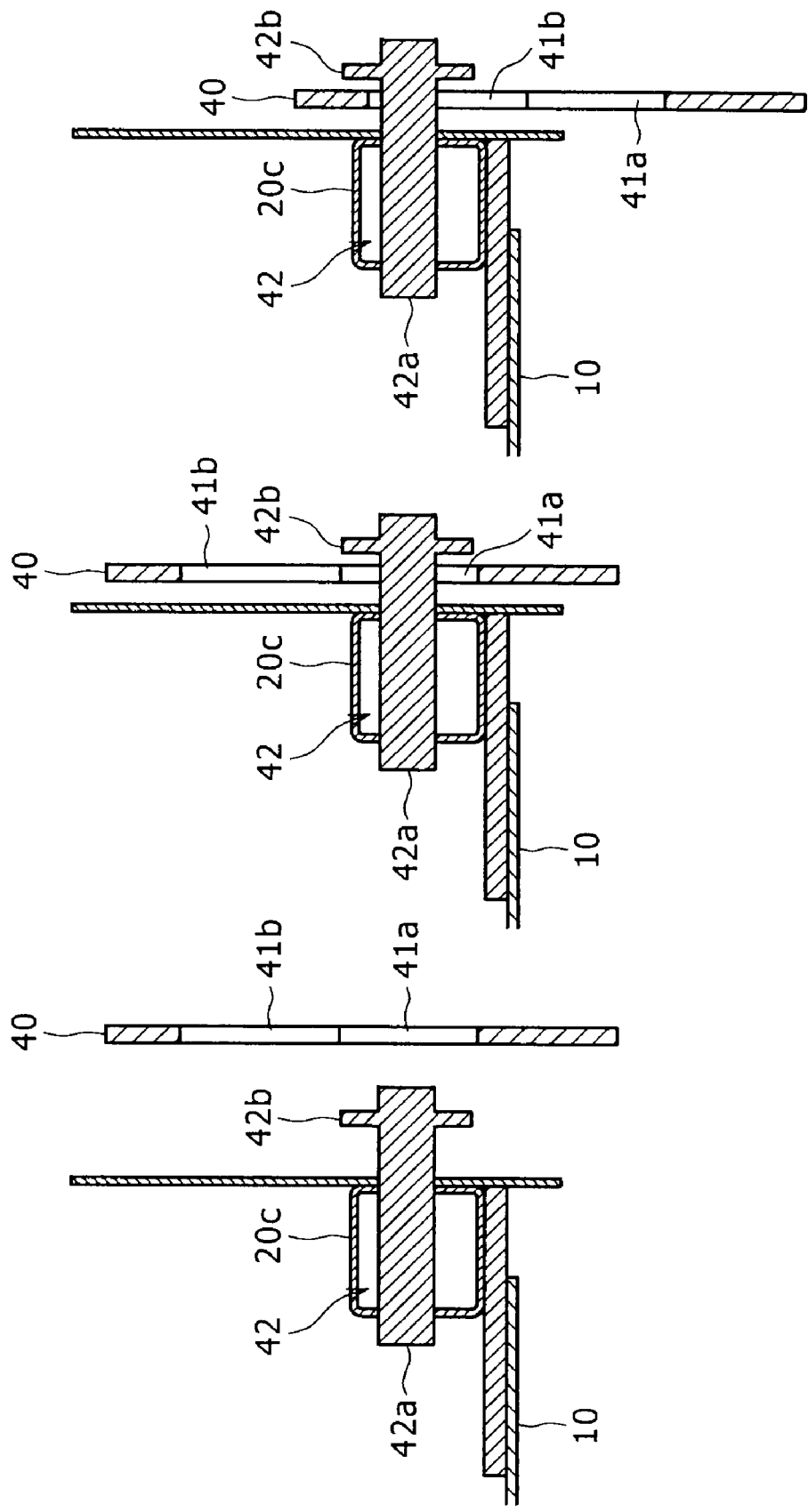
FIG. 12A is a side sectional view showing how the drivers cab is mounted on the base frame, in a state after mounting the shaft main body to the drivers cab.
FIG. 12B is a side sectional view showing how the drivers cab is mounted on the base frame, in a state where the shaft main body is inserted into the insertion hole of the plate.
FIG. 12C is a side sectional view showing how the drivers cab is mounted on the base frame, in a state where the plate is slid.

Now, a description will be given to the installation work with reference to FIG. 12.

After fixing the shaft member 42 to the beam member 20c as shown in FIG. 12A, the flange portion of the shaft member 42 is inserted into the passing portion 41a of the plate 40, and the main body portion 42a is disposed in the insertion hole 41 as shown in FIG. 12B.

Then, as shown in FIG. 12C, the plate 40 is moved so that the main body portion 42a may slide within the notch portion 41b, and a lower end part of the plate 40 is fixed to the base frame 2 with the bolt B2.

In this embodiment as well, if the drivers cab 4 is lifted beyond the range allowable by the installation mount 5, an outer surface of the main body portion 42a and an inner surface of the insertion hole 41 (notch portion 41b) are in contact with each other, thereby the lifting of the main body portion 42a and thus the lifting of the drivers cab 4 may be restrained by the plate 40.

It should be noted that, although the configuration in which the shaft members 26 and 42 are fixed to the beam member 20c has been described in the respective afore-mentioned embodiments, a fixed position of the shaft members 26 and 42 is not limited if that is at least the frame member of the drivers cab 4. For example, as shown in FIG. 13, in a case where a pair of right and left front supports 14 and 15 is arranged in a standing condition in front of the supports 16 and 17 as the frame members, it is possible to fix the shaft members 26 and 42 to the front support 14 or 15.

Figure 13:
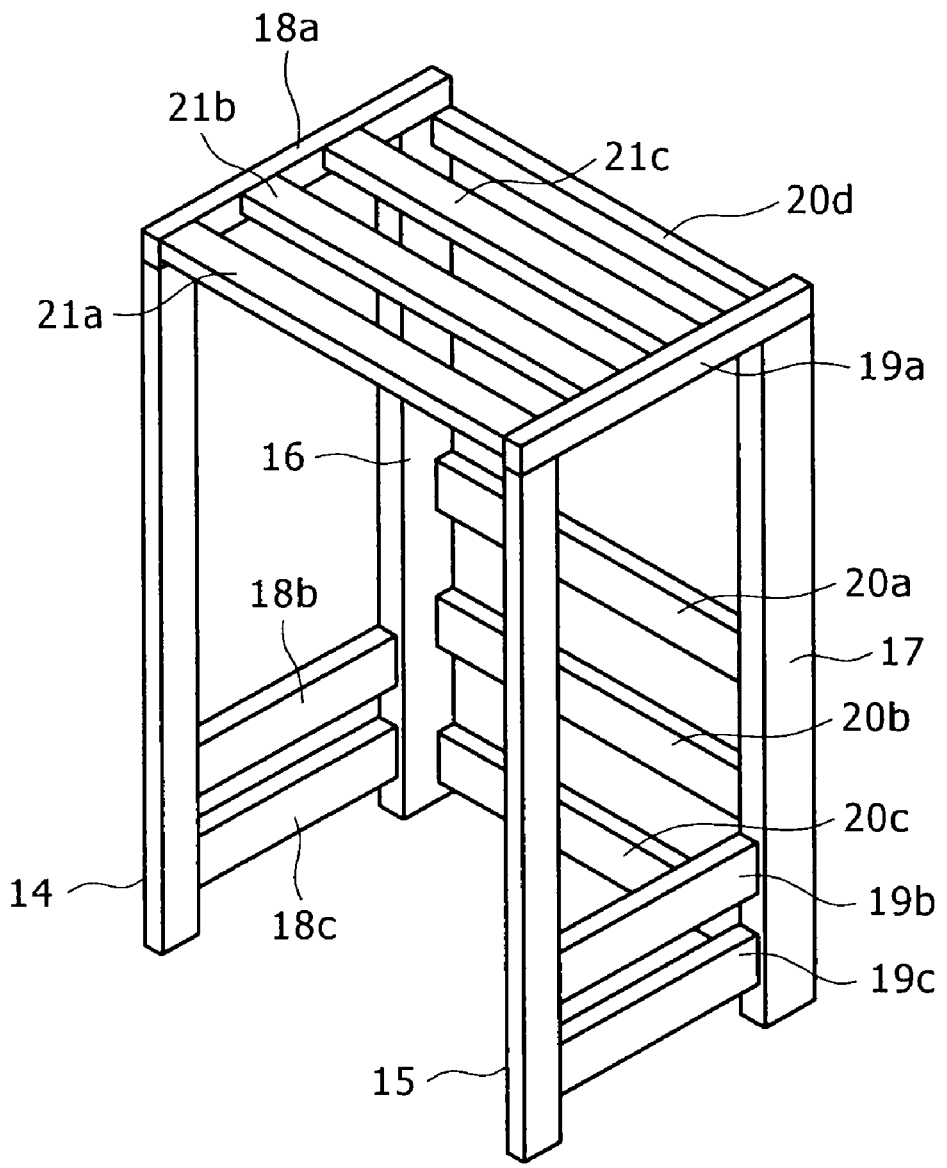
FIG. 13 is a schematic perspective view of a drivers cab according to another embodiment of the present invention.
Figure 14:
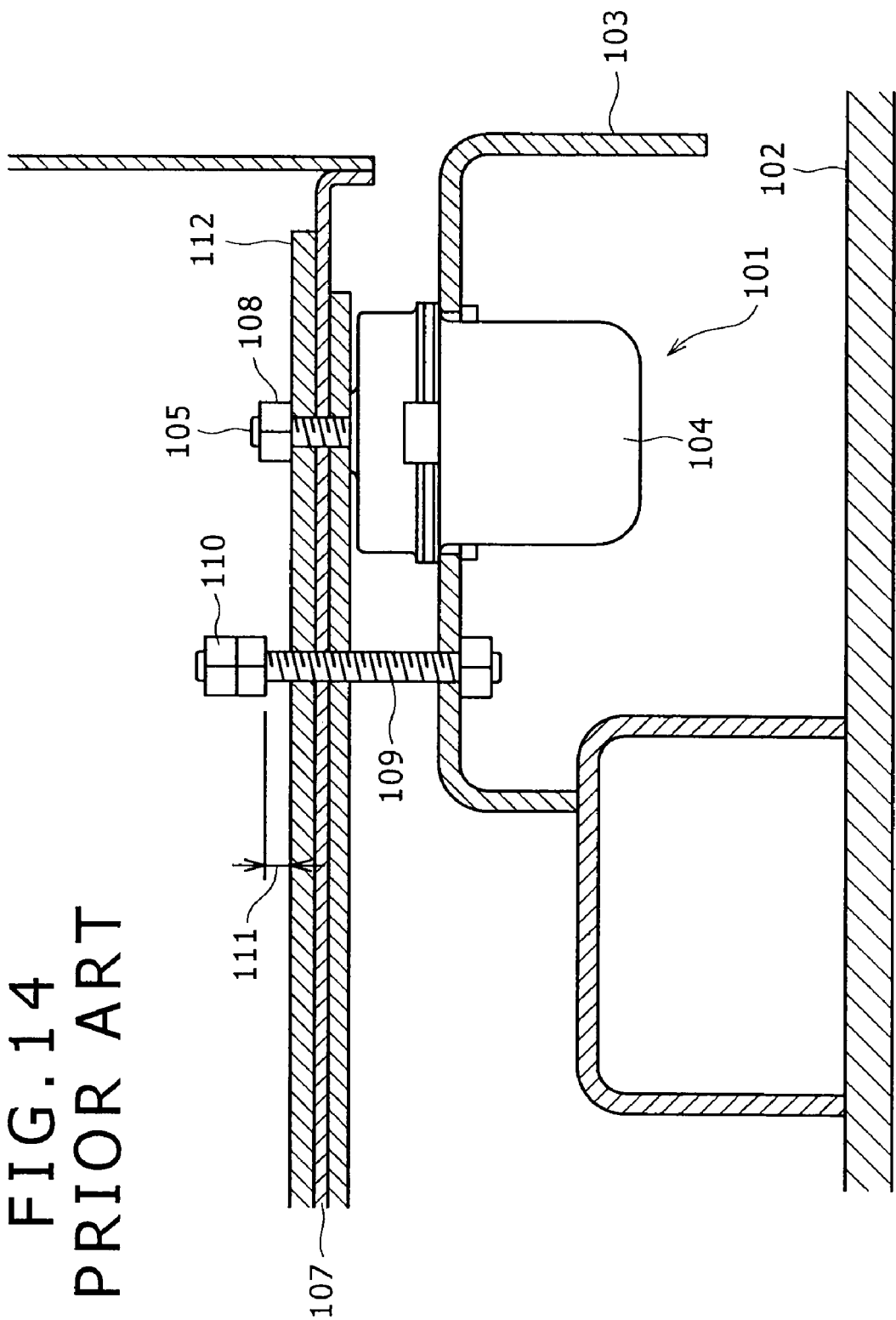
FIG. 14 is an enlarged side sectional view of a part of a hydraulic excavator of Patent Document 1.

Moreover, as shown in FIG. 13, in a case where the frame member is provided with three upper and lower beam members 18a to 18c extending longitudinally between the supports 14 and 16, three upper and lower beam members 19a to 19c extending longitudinally between the supports 15 and 17, and three front and rear beam members 21a to 21c extending transversely between the beam members 18a and 19a, it is possible to fix the shaft members 26 and 42 to any one of these beam members 18a to 18c, 14, 15, 19a to 19c, and 21a to 21c.

In this way, unlike the case where the driver's cab 4 is fixed to the floor plate 10 after reinforcing the floor plate 10, it is possible to restrain the lifting of the drivers cab 4 without reinforcing the existing configuration.

Although the invention has been described with reference to the preferred embodiments in the attached figures, it is noted that equivalents may be employed and substitutions made herein without departing from the scope of the invention as recited in the claims.

I claim:

1. A mounting structure of a drivers cab to a base frame in a construction machine, comprising:
   a base frame;
   a drivers cab provided on said base frame, said drivers cab includes a floor plate, and frame members which are provided on said floor plate and arranged so as to surround an operator's seat;
   vibration absorbing means for supporting said drivers cab in a state capable of moving up and down in a moving range with respect to said base frame, and for absorbing a vibration generated between said base frame and said drivers cab;
   a cantilevered projecting portion projecting laterally from one of said frame members, and an inserted member mounted to said base frame and has an insertion hole capable of receiving said projecting portion therethrough, wherein said projecting portion and said insertion hole are sized such that an inner surface of said insertion hole and an outer surface of said projecting portion are not in contact with each other within the moving range of said drivers cab allowable by said vibration absorbing means, and the inner surface of said insertion hole is contacted by an upper surface of said projecting portion when said drivers cab is lifted away from said base frame beyond said moving range.

2. The mounting structure of drivers cab to base frame according to claim 1, wherein said projecting portion is projected rearwardly from the one of the frame members provided at a position corresponding to a rear surface of said drivers cab, and said inserted member is fixed to said base frame so as to insert a rear part of said projecting portion.

3. The mounting structure of drivers cab to base frame according to claim 2, wherein said frame members include a beam member extending transversely to constitute the rear surface of said drivers cab, and said projecting portion is fixed to said beam member.

4. The mounting structure of drivers cab to base frame according to claim 1, wherein said frame members comprise tube members, and said projecting portion comprises a member fixed to said one of said frame members in a state of being passed through said frame member in a substantially horizontal direction.

5. The mounting structure of drivers cab to base frame according to claim 1, said projecting portion includes a main body member whose one end is removable with respect to said one of said frame members, and a large-sized member removable to the other end of said main body member and formed larger than said main body member, while said insertion hole of said inserted member is set to a size so as to insert said main body member and not to insert said large-sized member.

6. The mounting structure of drivers cab to base frame according to claim 5, wherein said inserted member and said base frame are configured removably to each other.

7. The mounting structure of drivers cab to base frame according to claim 1, wherein said projecting portion includes a main body portion extending laterally from said one of said frame members, and a large-sized portion provided at a tip of said main body portion and formed larger than said main body portion, while said insertion hole of said inserted member has a shape having a passing portion capable of passing said large-sized portion therethrough, and a notch portion cut from said passing portion and set in a size so as to insert said main body portion and not to insert said large-sized portion, and said inserted member is configured removably with respect to said base frame.

8. A construction machine comprising:
a base frame;
a drivers cab provided on said base frame, said drivers cab includes a floor plate, and frame members which are provided on said floor plate and arranged so as to surround an operator's seat;
vibration absorbing means for supporting said drivers cab in a state capable of moving up and down in a moving range with respect to said base frame, and for absorbing a vibration generated between said base frame and said drivers cab;
a cantilevered projecting portion projecting laterally from one of said frame members, and an inserted member mounted to said base frame and has an insertion hole capable of receiving said projecting portion therethrough, wherein said projecting portion and said insertion hole are sized such that an inner surface of said insertion hole and an outer surface of said projecting portion are not in contact with each other within the moving range of said drivers cab allowable by said vibration absorbing means, and the inner surface of said insertion hole is contacted by an upper surface of said projecting portion when said drivers cab is lifted away from said base frame beyond said moving range; and
a working attachment mounted on said base frame so as to raise or lower the working attachment.

9. The mounting structure of drivers cab to base frame according to claim 1, wherein said inserted member is removably mounted to said base frame.

* * * * *